United States Patent [19]

Lin

[11] 4,266,040

[45] May 5, 1981

[54] POLYAZLACTONE-ELECTRON DEFICIENT ETHYLENICALLY UNSATURATED RESINOUS COMPOSITIONS AND METHOD FOR FOAMING SAME

[75] Inventor: Shiow-Ching Lin, Arlington Heights, Ill.

[73] Assignee: DeSoto, Inc., Des Plaines, Ill.

[21] Appl. No.: 163,519

[22] Filed: Jun. 27, 1980

[51] Int. Cl.³ .............................................. C08J 9/08
[52] U.S. Cl. ................................. 521/90; 521/128; 521/155; 521/182; 521/901; 525/26; 528/73; 528/75
[58] Field of Search ................. 521/90, 128, 182, 901

[56] References Cited

U.S. PATENT DOCUMENTS

| | | | |
|---|---|---|---|
| 2,610,157 | 9/1952 | Gluesenkamp | 521/90 |
| 2,623,059 | 12/1952 | Mathes | 521/90 |
| 3,272,764 | 9/1966 | Mueller et al. | 521/90 |
| 3,694,417 | 9/1972 | Rigby et al. | 528/322 |
| 4,097,425 | 6/1978 | Nignik | 521/90 |

*Primary Examiner*—Morton Foelak
*Attorney, Agent, or Firm*—Dressler, Goldsmith, Shore, Sutker & Milnamow, Ltd.

[57] ABSTRACT

A reaction product of (1) resin containing a plurality of electron deficient ethylenically unsaturated groups and (2) a polyazlactone. The product may be formed without the liberation of a gas and cured at a higher temperature with the liberation of a gas to thereby form foamed product.

21 Claims, No Drawings

POLYAZLACTONE-ELECTRON DEFICIENT ETHYLENICALLY UNSATURATED RESINOUS COMPOSITIONS AND METHOD FOR FOAMING SAME

DESCRIPTION

Technical Field

The present invention relates to new resinous compositions, particularly to foamable resinous compositions, and especially to solid resinous compositions which release carbon dioxide when heated so that they can be foamed without introducing extraneous gas.

Background Art

Foamed resin products are useful in several areas, particularly where lightness of weight or thermal insulation are desired. Most of these foams are prepared by introducing volatile foaming agents into the foam resin constituents during hardening or cure, or by the release of volatile condensation by-products during polymerization of the resins. Thus, the foam is generally prepared at the same time or concomitant with the preparation of the resin.

Azlactones, also generally named as oxazol-5-ones, are known compounds. Substituted monoazlactones are taught in U.S. Pat. No. 3,694,417 to Rigby et al. to be reactive with compounds containing at least two ethylenic carbon-carbon double bonds per molecule to form solid polymers. These polymers are prepared by heating the two reactants with elimination of carbon dioxide during the reaction. The disclosure of the Rigby et al. patent will be compared with this invention in greater detail hereinafter. Diazlactones are also known, and their preparation is taught in an article by Cleaver and Pratt, J. Am. Chem. Soc., 77, 1544 (1955).

Description of the Invention

According to this invention, resinous compositions are prepared comprising the reaction product of (1) at least one resin containing a plurality of electron deficient ethylenically unsaturated groups other than vinyl ester and vinyl ether groups and (2) a polyazlactone having the structure shown in formula I:

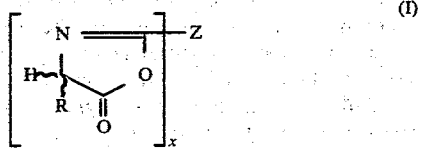

wherein Z is a saturated aliphatic or aromatic polyvalent organic group, preferably containing about 2 to about 16 carbon atoms;

R is selected from hydrogen, saturated substituted and unsubstituted cyclic and acyclic radicals containing about 1 to about 10 carbon atoms, and substituted and unsubstituted aromatic radicals containing about 6 to about 10 carbon atoms; and x is a number whose average value is at least about 2, and is preferably about 2 to about 4.

Wavy lines such as those of formula I, above, are used herein to indicate that no stereochemistry is implied about the atom to which the wavy line attached group is bonded.

To summarize preferred practice herein Z is paraphenylene, tetramethylene or dimethylene, thereby making the average value of x equal to about 2; the electron deficient ethylenic unsaturation is constituted by unsaturated groups each having at least one carbonyl group adjacent thereto; and the reaction products are formed without releasing carbon dioxide so that they are capable of forming a foam after their initial formation.

The reaction product compositions are formed by reacting the above described reactants at a temperature below which carbon dioxide gas evolves, usually below about 50° C. The preferred reaction products are solid at ambient temperature and may then be converted into foamed products by heating them to a temperature of at least about 50° C., and preferably at a temperature of about 50° C. to about 200° C., until the evolution of carbon dioxide ceases, or the desired amount of foam is prepared.

The compositions of the present invention differ from those taught in U.S. Pat. No. 3,694,417 to Rigby et al. in several respects. First, Rigby et al. teach only the use of monoazlactones and do not suggest the polyazlactones taught herein. Second, the use of polymeric electron deficient resins, such as the preferred linear polyesters taught herein, is not contemplated by Rigby et al. Third, the Rigby et al. teachings are directed solely to the formation of polymers from azlactones and ethylenic bondcontaining monomers and do not suggest the reaction of preformed polymers with polyazlactones as is preferred herein. Fourth, Rigby et al. teach the production of only solid polymers, while solids, liquids and gels are contemplated herein. Fifth, in the Rigby et al. patent, carbon dioxide is driven off concomitant with polymer formation, while in this invention carbon dioxide is preferably driven off after the resinous reaction product has been formed.

The polyazlactone reactants of formula I are also known as poly 2-substituted-[5(4H)-oxazolones]. The polyazlactones of formula I have average x values of at least about 2, and x may also have average values greater than about 2, up to several hundred or more when the polyazlactones are oligomeric or polymeric. For example, the average value of x would be about 3 for an s-phenenyl Z group. For another example, when the polyazlactone is prepared from an oligomer having an average molecular weight of about 1000 (prepared from a 1:2 molar of mixture acryloyl chloride and methyl acrylate), then x would typically have an average value of about 4. Similarly, when a high polymer having a molecular weight of about 50,000 is prepared from the same monomers in the same mole ratio, then x would typically have an average value of about 200.

The most preferred polyazlactones, having an average of about two azlactone groups per molecule, are 2,2'-bis-azlactones or 2,2'-bis-[5(4H)-oxazolones].

The Z group of the polyazlactone molecule is comprised of a polyvalent organic group and although it may contain one thousand or more carbon atoms, as when the polyazlactone is a high polymer as discussed above, preferably, Z contains about 2 to about 16 carbon atoms. The preferred Z groups, where x has an average value of about 2, may be exemplified by saturated aliphatic groups such as dimethylene, tetramethylene, cyclohexylene, and the like, including substituted derivatives such as 3-methylpentamethylene. In addition, the preferred Z group may be comprised of polyvalent aromatic groups such as para,para-diphenylene, and substituted aromatics such as 2-ethyl-para-phenylene.

Generally, the only limitation on the Z group is that it may not contain a reactive group such as vinyl or ethynyl which would allow the polyazlactone to react with itself. Thus, the Z group may be a polyvalent saturated aliphatic or aromatic organic group.

The preferred 2,2'-bis-azlactones may be prepared in the manner described in the before-mentioned article by Cleaver and Pratt. The most preferred polyazlactones are the 2,2'-para-phenylene-bis-azlactones having structures corresponding to those shown in formula II, wherein R is as above described:

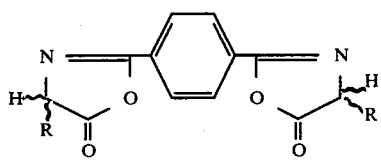
(II)

The R groups of the polyazlactones of this invention are described previously. Examples of typical R groups include methyl, ethyl, butyl, iso-propyl, cyclohexyl, cyclopentyl, phenyl, benzyl, meta-chlorophenyl and the like. As is the case with the Z groups, R may not contain a group which would allow the polyazlactone to react with itself, such as ethylenic or acetylenic unsaturation.

The compositions of this invention are prepared by reacting the above-described polyazlactones with at least one resin containing a plurality of electron deficient ethylenically unsaturated groups. Mixtures of two or more resins, each containing a plurality of electron deficient ethylenically unsaturated groups may also be reacted with the polyazlactone to prepare the compositions of this invention.

The phrase "electron deficient ethylenically unsaturated group" is a conventional phrase in the art and is used herein in its normal context to include ethylenically unsaturated groups which are bonded directly to electron-withdrawing substituents such as the carbonyl groups of aldehydes, ketones, acids, esters, amides, imides and the like, or substituents such as nitrile groups, nitro groups and sulfone groups, such as are disclosed by Rigby et al. in U.S. Pat. No. 3,694,417. In addition, ethylenic groups bonded directly to less powerful electron-withdrawing groups such as phenyl or chloro are also useful herein. Thus, known resins containing styryl groups or vinyl chloride groups are useful herein. It is also possible that two or more different electron-withdrawing substituents may be on one resin. Vinyl ester and vinyl ether groups are not normally considered to be "electron deficient ethylenically unsaturated groups", but to avoid any question, vinyl ester and vinyl ether groups are specifically excluded from "electron deficient ethylenically unsaturated groups."

In preferred practice, the resins containing a plurality of electron deficient ethylenically unsaturated groups contain at least one carbonyl group bonded directly to each ethylenically unsaturated group. Examples of preferred resins include diacrylate- or dimethacrylate-terminated resins prepared from polyethylene glycols, such as tetraethylene glycol diacrylate, diacrylate terminated carbodiimide-urethane resins such as that illustrated in Example 2, and N-maleimide-terminated resins, such as para-phenylene-bis-(N-maleimide).

In more preferred practice, a linear polyester resin containing polyesterified maleic acid or fumaric acid repeating units is chosen. Examples of typical useful linear polyester resins include those prepared from maleic anhydride esterified with ethylene glycol, from dimethyl fumarate esterified with triethylene glycol, and the like. These linear polyesters contain ethylenically unsaturated groups having two carbonyl groups adjacent thereto. In most preferred practice, the linear polyesters are flowable at room temperature.

It is believed that the reaction product formed between the resin and preferred polyazlactone where x has an average value of 2 has a structure corresponding at least in part to that shown in formula III:

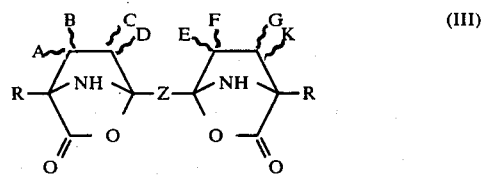
(III)

wherein Z and R are as defined hereinbefore, A, C, E, and G are selected from hydrogen, alkyl groups having about 1-4 carbon atoms present in at least a first resin, and mixtures thereof; and B, D, F and K are selected from the group consisting of hydrogen, terminal resin carbonyl groups and the atoms bonded thereto through and including the terminus of at least a first resin, internal carbonyl groups bonded to the remaining portion of at least a first resin, and mixtures thereof.

In another preferred embodiment, the resins containing a plurality of electron deficient ethylenically unsaturated groups may be the liquid reaction products of low molecular weight hydroxy or carboxy functional resins with electron deficient ethylenically unsaturated groups. Examples of the hydroxy functional resins include those prepared by the esterification of glycerin, trimethylol propane or pentaerthritol with succinic anhydride, maleic anhydride or phthalic anhydride. Examples of suitable carboxy functional resins include those prepared by the esterification of ethylene glycol, tetraethylene glycol, or propylene glycol and pyromellitic anhydride, citric acid or 3,3',4,4'-benzophenonetetracarboxylic dianhydride. Methods for the preparation of low molecular weight resins containing the stated functionality are well known to the art and usually include the use of equimolar portions of acid and alcohol in conjunction with limited reaction times.

Useful electron deficient ethylenically unsaturated groups may illustratively be derived from molecules such as acrylic or methacrylic anhydrides or acid chlorides, N-alkylol acrylamides or methacrylamides such as N-methylol acrylamide, maleic anhydride or the like. These electron deficient ethylenically unsaturated molecules may then be esterified or etherified to the carboxy or hydroxy functionality of the above low molecular weight resins to prepare the desired resins containing a plurality of electron deficient ethylenically unsaturated groups.

Formula III (hereinbefore) illustrates the cross-link formed between the polyazlactone and the resin molecule containing a plurality of election deficient ethylenially unsaturated groups. The polyazlactone may form an internal cross-link within one resin molecule, a more preferred cross-link between two like, first, resin molecules, or a cross-link between two dissimilar, first and second, resin molecules.

To prepare the compositions of this invention, the polyazlactone and at least one resin having a plurality of electron deficient ethylenically unsaturated groups are mixed and reacted together to form a reaction product. The reaction is preferably carried out at a temperature below which carbon dioxide gas is evolved, and that evolution of gas usually occurs at a reaction temperature greater than about 50° C. Since the evolution of the gas usually results in the formation of a foam, and since foams are preferably formed after the formation of the reaction product, the reaction is preferably carried out at a temperature below about 50° C. As is true for chemical reactions generally, decreasing the reaction temperature tends to decrease the rate of reaction. Thus, the selection of a minimum temperature at which to carry out this reaction is a matter of convenience, but it is preferred to work as close to 50° C. as avoids carbon dioxide generation.

It may be helpful to illustrate the reaction products of the type described in formula III.

Using a linear polyester resin containing esterified maleic acid repeating groups as illustrative, the A, C, E and G groups may be hydrogen atoms or alkyl groups having about 1-4 carbon atoms on either carbon of each reacted "maleic" double bond, the reacted "maleic" double bonds being within the same resin molecule or in two different resin molecules. The B, D, F and K groups would contain the terminal carbonyl group adjacent the reacted ethylenic bond and the atoms bonded thereto through the terminus of each resin, or an internal carbonyl group bonded to the remaining portion of each resin molecule, or mixtures of both.

When a resin such as tetraethylene glycol diacrylate is reacted with a bis-azlactone to form a reaction product of this invention, A, B, C, E, F and G would be hydrogen, with D and K being a carbonyl group bonded to the remainder of the molecule. The reaction product of a bis-azlactone and a resin such as tetraethylene glycol dicrotonate illustrates one situation where A and E would be methyl while B, C, F and G would be hydrogen. The reaction product of a bis-azlactone and a resin such as tetraethylene glycol dimethacrylate illustrates the situation where A, B, E and F are hydrogen, D and K are carbonyl and C and G are both methyl.

The reaction products discussed in the two paragraphs immediately above have been discussed from the viewpoint that one resin, having one type of recurring unit, e.g., esterified maleic acid, has been reacted with the bis-azlactone. That discussion was for purposes of illustration and ease of understanding only. It is pointed out, that while the A,B,C,D,E,F,G and K groups in the above discussion are from a single resin having a first recurring unit, it is also possible that two or more resins, (first resin, second resin, etc.) each having a plurality of electron deficient ethylenically unsaturated groups and recurring units different from the first recurring units may be utilized. Thus, for example, the A,B,C and D groups would be groups present in a first resin, having a first recurring unit, while the E,F,G and K groups would be groups present in a second resin, which resin has second recurring units different from the first recurring units of the first resin, thereby making the first and second resins different. The use of two different resins is illustrated in Example 2, hereinafter.

The reaction product of the polyazlactone and resin containing electron deficient ethylenically unsaturated groups is preferably foamable; that is, the reaction products are preferably not themselves foams, but may subsequently be made into foams. It is also possible that the reaction products may be foams prepared by blowing an inert gas into the reaction mixture during the reaction. However, one of the advantages of the compositions of this invention is that they may be formed at one time and then converted into a foam at some later time.

The reaction products of this invention may be converted into foams by heating them to a temperature of at least about 50° C. and maintaining the temperature until the evolution of carbon dioxide ceases, or the desired foam density is produced. In preferred practice, the reaction mixture is foamed by heating it to a temperature of about 50° C. to about 200° C. until evolution of carbon dioxide begins, and maintaining or elevating that temperature until the evolution of carbon dioxide ceases or the desired foam density is produced. Of course, foam compositions may be prepared in essentially one step by simply mixing and reacting the polyazlactone and resin at a sufficiently elevated temperature to cause and maintain carbon dioxide evolution.

After the carbon dioxide has been evolved, it is believed that the resulting compositions have a structure corresponding at least in part to the mechanistically predicted structure shown in formula IV (below), using the preferred polyazlactone where x has an average value of 2 as exemplary.

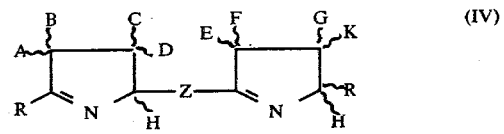
(IV)

wherein A,B,C,D,E,F,G and K, R and Z are as previously defined.

The structure shown in formula IV depicts the nitrogen-carbon double bond in both of the mechanistically predicted positions. In practice, the position of the nitrogen-carbon double bonds may be as shown in formula IV, or each double bond may include the carbon atom behind of the R group or the carbon atom bonded to the Z group, or mixtures of the positionally isomeric double bonds may exist in the resulting composition. The position of the hydrogen, H, atom shown in formula IV may be determined once the position of the nitrogen-carbon double bond in known, and vice versa.

The reaction products of the present invention are useful in several areas. For example, they may be used as potting compounds for electrical components, as resin systems for use in conjunction with glass, graphite or other fibers, as coating compositions which solidify and may be foamed at a later time or simply to fill voids in objects as in the case of other resin compositions. The foamed products are useful as insulation which may be formed and foamed in place, and for providing light weight rigidifying elements for structural uses.

BEST MODE FOR CARRYING OUT THE INVENTION

Example 1

Foam From a Linear Polyester and and 2,2'-phenylene-bis [4-methyl-5(4H)-oxazolone]

A linear polyester was prepared by first reacting 31.65 g of maleic anhydride with 5.98 g of n-butyl alcohol in 100 ml. of toluene. After an hour of agitation 102 g of polypropylene glycol [MW 423 g/mole] and 2 drops of concentrated sulfuric acid were added. The mixture was heated at reflux for 30 minutes, then the water was gradually removed by azeotropic distillation. The reaction was continued until no more water could be collected (98% of the theoretical amount being obtained). The solvent was removed under vacuum and a flowable resin was obtained.

2,2'-Para-phenylene-bis-[4-methyl-5(4H)-oxazolone] was prepared from d,l-alanine and terephthaloyl chloride following the procedure of C. S. Cleaver and B. C. Pratt, J. Am. Chem. Soc., 77, 1544 (1955).

6.64 g Of the above-prepared resin were admixed with 2 g of the above-prepared polyazlactone. After thorough mixing to effect a reaction, the admixture was heated to 120° C. and maintained at this temperature for about 30 minutes, at which time the release of carbon dioxide had ceased. On cooling, a yellow, tough elastomeric foam was obtained.

Example 2

Mixed Acrylate Resin Foam

The mixture containing 1 g of 2,2'-para-phenylene-bis-[4-methyl-5(4H)-oxazolone] of Example 1 and 9 g of a diacrylate blend consisting of 30% by weight of tetraethylene glycol diacrylate and 70% by weight of diacrylate terminated carbodiimide-urethane resin (preparation below), was heated in a beaker in an air circulating oven at 105° C. for 40 minutes. A pale yellow tough rigid foam was obtained.

The diacrylate terminated carbodiimide-urethane resin was prepared as described in Example 2 of my copending, co-assigned patent application Ser. No. 111,075, filed on Jan. 10, 1980. Briefly, 2-hydroxyethyl acrylate (668.7 g) was reacted with 2,4-toluene diisocyanate (1003 g) and 2,6-di-tert-butyl-p-cresol (0.95 g) at a temperature below 45° C. Thereafter, toluene (600 ml) and 1-phenyl-3-methyl phospholene-1-oxide (5 g) were added to the flask and the temperature raised to 80° C. and maintained at that temperature until infrared spectroscopy indicated the absence of an isocyanate absorption (48 hours). The toluene was then removed to yield a light brown colored, very viscous liquid.

Example 3

Non-foamed Composition

A non-foamed composition of this invention was prepared by reacting 2.61 g of 4,4'-diaminodiphenyl ether bis(N-maleimide) with 3.45 g of 2,2'-para-phenylene-bis-[4-methyl-5(4H)-oxazolone] in 20 ml of N,N-dimethylacetamide. The reaction began at ambient temperature and became exothermic. At about 50° C., the solution started to solidify, and a solid mass settled to the bottom of the beaker. The beaker and its composition were then heated by external means, and at 80° carbon dioxide gas evolution began and became very fast as the temperature increased. A brown, rigid, insoluble material was obtained from the precipitated mass.

What is claimed is:

1. A foamable composition comprising the reaction product of (1) at least one resin containing a plurality of electron deficient ethylenically unsaturated groups other than vinyl ester and vinyl ether groups and (2) a polyazlactone having the structural formula:

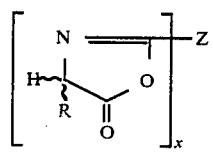

wherein Z is a saturated aliphatic or aromatic polyvalent organic group;

R is selected from the group consisting of hydrogen, saturated substituted and unsubstituted cyclic and acyclic radicals containing about 1 to about 10 carbon atoms, and substituted and unsubstituted aromatic radicals containing about 6 to about 10 carbon atoms; and x is a number whose average value is at least about 2.

2. The composition of claim 1 wherein said electron deficient ethylenically unsaturated groups comprise ethylenically unsaturated groups bonded directly to electron-withdrawing substituents, said electron-withdrawing substituents being selected from the group consisting of carbonyl groups, nitrile groups, nitro groups, sulfone groups, phenyl groups and chloro groups.

3. The composition of claim 2 wherein said electron-withdrawing substituent is the carbonyl group of a substituent selected from the group consisting of aldehyde, ketone, acid, ester, amide and imide.

4. The composition of claim 1 wherein Z is selected from the group consisting of para-phenylene, tetramethylene and dimethylene.

5. A composition foamable without the introduction of extraneous gas comprising the reaction product of (1) at least one resin containing a plurality of electron deficient ethylenically unsaturated groups other than vinyl ester and vinyl ether groups and (2) a polyazlactone having the structural formula:

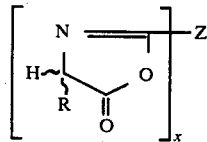

wherein Z is a saturated aliphatic or aromatic polyvalent organic group;

R is selected from the group consisting of hydrogen, saturated substituted and unsubstituted cyclic and acyclic radicals containing about 1 to about 10 carbon atoms, and substituted and unsubstituted aromatic radicals containing about 6 to about 10 carbon atoms; and x is a number whose average value is at least about 2; wherein said reaction is carried out at a temperature below which carbon dioxide gas is evolved.

6. The composition of claim 5 wherein said reaction product is a solid.

7. The composition of claim 5 in which there are two resins, each containing a plurality of electron deficient ethylenically unsaturated groups.

8. The composition of claim 5 wherein said resin is a linear polyester.

9. The composition of claim 8 wherein said linear polyester is flowable at ambient temperature.

10. A foamable composition comprising the reaction product of (1) at least one linear polyester resin, flowable at ambient temperature and comprising a plurality of ethylenically unsaturated groups, each of said groups having at least one carbonyl group adjacent thereto, and (2) a polyazlactone having the structural formula:

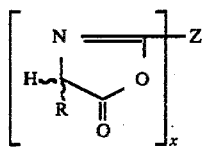

wherein Z is a saturated aliphatic or aromatic polyvalent organic group containing about 2 to about 16 carbon atoms;

R is selected from hydrogen, saturated substituted and unsubstituted cyclic and acyclic radicals containing about 1 to about 10 carbon atoms, and substituted and unsubstituted aromatic radicals containing about 6 to about 10 carbon atoms; and x is a number whose average value is about 2.

11. The composition of claim 10 wherein said polyazlactone has the structure:

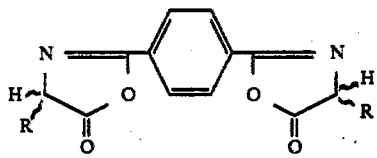

12. The composition according to claim 10 wherein said polyester contains polyesterified maleic acid or fumaric acid repeating units.

13. A method of forming a foam composition comprising:
(A) reacting (1) at least one resin containing a plurality of electron deficient ethylenically unsaturated groups other than vinyl ester and vinyl ether groups with (2) a polyazlactone having the formula:

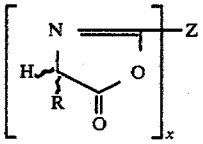

wherein Z is a saturated aliphatic or aromatic polyvalent organic group;

R is selected from hydrogen, saturated substituted and unsubstituted cyclic and acyclic radicals containing about 1 to about 10 carbon atoms, and substituted and unsubstituted aromatic radicals containing about 6 to about 10 carbon atoms; and x is a number whose average value is at least about 2; so that at least some of said ethylenically unsaturated groups are reacted to form a reaction product, (B) causing said reaction product to foam by heating same, and (C) continuing said heating until the evolution of carbon dioxide gas ceases or the desired amount of foam is produced.

14. The method of claim 13 wherein said resin is comprised of a plurality of ethylenically unsaturated groups, each of said groups having at least one carbonyl group adjacent thereto.

15. The method of claim 14 wherein said resin is a linear polyester, flowable at ambient temperature and comprising esterified maleic acid or fumaric acid repeating units.

16. The method of claim 13 wherein two resins each containing a plurality of electron deficient ethylenically unsaturated groups are reacted with said polyazlactone.

17. A method of forming a foamable composition comprising reacting at a temperature of less than about 50° C. (1) at least one linear polyester, flowable at ambient temperature and comprising esterified maleic acid or fumaric acid repeating units with (2) a polyazlactone having the formula:

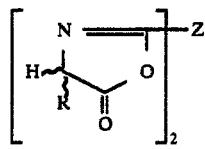

wherein Z is selected from para-phenylene, tetramethylene and dimethylene, and R is selected from hydrogen, saturated substituted and unsubstituted cyclic and acyclic radicals containing about 1 to about 10 carbon atoms, and substituted and unsubstituted aromatic radicals containing about 6 to about 10 carbon atoms.

18. The method of claim 17 wherein said foamable composition is a solid at ambient temperature and is formed without the evolution of a gas.

19. The method of forming a foam comprising heating the composition of claim 1 to a temperature of at least about 50° C., and continuing said heating until the evolution of carbon dioxide ceases.

20. The method of forming a foam comprising heating the composition of claim 5 to a temperature of about 50° C. to about 200° C. until evolution of carbon dioxide begins, and maintaining said temperature until the evolution of carbon dioxide ceases or a desired foam density is produced.

21. The method of forming a foam comprising heating the composition of claim 10 to a temperature of about 50° C. to about 200° C. until evolution of carbon dioxide begins, and maintaining said temperature until the evolution of carbon dioxide ceases or a desired foam density is produced.

* * * * *